(12) United States Patent
Chen

(10) Patent No.: US 7,312,397 B1
(45) Date of Patent: Dec. 25, 2007

(54) PANEL COVER STRUCTURE FOR A COMPUTER CASING

(75) Inventor: Deng-Hsi Chen, Keelung (TW)

(73) Assignee: Lian Li Industrial Co., Ltd., Keelung (TW)

( * ) Notice: Subject to any disclaimer, the term of this patent is extended or adjusted under 35 U.S.C. 154(b) by 0 days.

(21) Appl. No.: 11/480,984

(22) Filed: Jul. 6, 2006

(51) Int. Cl.
*H02G 3/14* (2006.01)

(52) U.S. Cl. .......................... 174/66; 174/67; 220/241; 361/600; 361/679

(58) Field of Classification Search .................. 174/66, 174/67; 220/241, 242; 361/679–687, 724–727, 361/600
See application file for complete search history.

(56) References Cited

U.S. PATENT DOCUMENTS

| | | | | |
|---|---|---|---|---|
| 5,197,789 A | * | 3/1993 | Lin ......................... | 312/223.2 |
| 6,911,601 B1 | * | 6/2005 | Gilbert et al. ................ | 174/66 |
| 7,183,487 B1 | * | 2/2007 | O'Young et al. ............. | 174/66 |
| 7,193,855 B2 | * | 3/2007 | Fan et al. .................... | 361/724 |
| 2002/0171999 A1 | * | 11/2002 | Huang ........................ | 361/600 |

* cited by examiner

*Primary Examiner*—Dhiru R. Patel
(74) *Attorney, Agent, or Firm*—Troxell Law Office, PLLC

(57) ABSTRACT

A panel cover structure for a computer casing, which is used to be pivoted on a front of the computer casing, is composed of a base panel, and at least one piece of decoration panel which is assembled on a front of the base panel, such that a noise transmitting from an interior of the computer casing to the front can be greatly reduced and a perfect protection effect can be provided, after the panel cover is closed. In addition, the aforementioned decoration panel can be made by splicing a single piece or multiple pieces of panel body, so as to generate a decoration effect of plural kinds of variations.

11 Claims, 6 Drawing Sheets

PANEL COVER STRUCTURE FOR A COMPUTER CASING

BACKGROUND OF THE INVENTION a) Field of the Invention

The present invention relates to a panel cover structure for a computer casing, which is used to be pivoted on a front of a computer casing for protecting its panel and other computer equipment, and more particularly to a panel cover structure which is provided with a good sound-proof effect and is provided with a decoration effect of multiple variations.

b) Description of the Prior Art

A front of conventional computer casing is usually installed with a panel in all kinds of various models, and a plurality of control buttons which are connected to an interior of the computer, in addition to being provided with an effect of decoration. Referring to FIG. 1, a front edge of computer casing 10 is provided with a panel 101 on which is located with openings 1011 for installing a CD-ROM (read-only memory) drive, a floppy disk drive, a CD (compact disc) burner, a hard disk case, or other peripheral equipment, and a plurality of control buttons 1012. Each opening 1011 is provided with a corresponding cover board 1013, and a conventional design of panel 101 usually includes a change in line, slope, or color. However, disregarding the range of variation, all of the computer peripheral equipment on the panel 101 is exposed out of the panel 101, which is difficult to achieve a protection effect. To improve this effect, there are a lot of computer casings with a panel protection cover in the market. Yet, a model of this kind of panel protection cover is even limited, and its protection effect is not perfect either. Moreover, as most of the panels of computer casings on the existing market are made by a plastic material, the casings are usually made by a metallic material to emplace the computer peripheral equipment, and the fronts of the casings are provided with corresponding openings or slots; therefore, operational sound (such as the operational sound of fan, the operational sound of hard disk drive, or even the operational sound of CD-ROM drive) of all kinds of equipment in an interior of computer will be transmitted out from the fronts, with an annoying noise enabling an operator to feel even uncomfortable. In addition, it is difficult to stop the noise by just using the plastic panel, and it is not able to consider a beauty in model at the same time, by adding the panel cover made by the metallic material. Therefore, an improvement is necessary.

Accordingly, a brand new panel cover structure for a computer casing is invented, which is constituted by overlapping and assembling two layers of metallic boards, and is therefore provided with a good protection and sound-proof effect. In addition, a decoration panel in a front can be freely replaced by different splicing methods according to requirement, in order to be provided with different decoration effects.

SUMMARY OF THE INVENTION

The primary object of present invention is to provide a panel cover structure which is provided with a good protection and sound-proof effect, and which is made by splicing at least one piece of replaceable decoration panel to form different decoration effects on the surface.

Accordingly, the panel cover structure for a computer casing of present invention, which is used to be pivoted on the front of computer casing, includes a base panel, a decoration panel, and an elastic latching member, wherein a side edge of the base panel is provided with a pivot member to be pivoted on the front of computer casing, a surface of the base panel is provided with a plurality of locking members, and a surface of the decoration panel is also provided with a plurality of corresponding locking members to assemble the decoration panel on the base panel. In addition, the elastic latching member is installed at the other side edge of aforementioned pivot member of the base panel, and is constituted by a housing, a spring, and a steel ball, wherein the spring and steel ball are installed in an interior of the housing, and the elastic latching member is latched to a latching piece of computer casing with a part of the steel ball that is exposed out of the housing.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
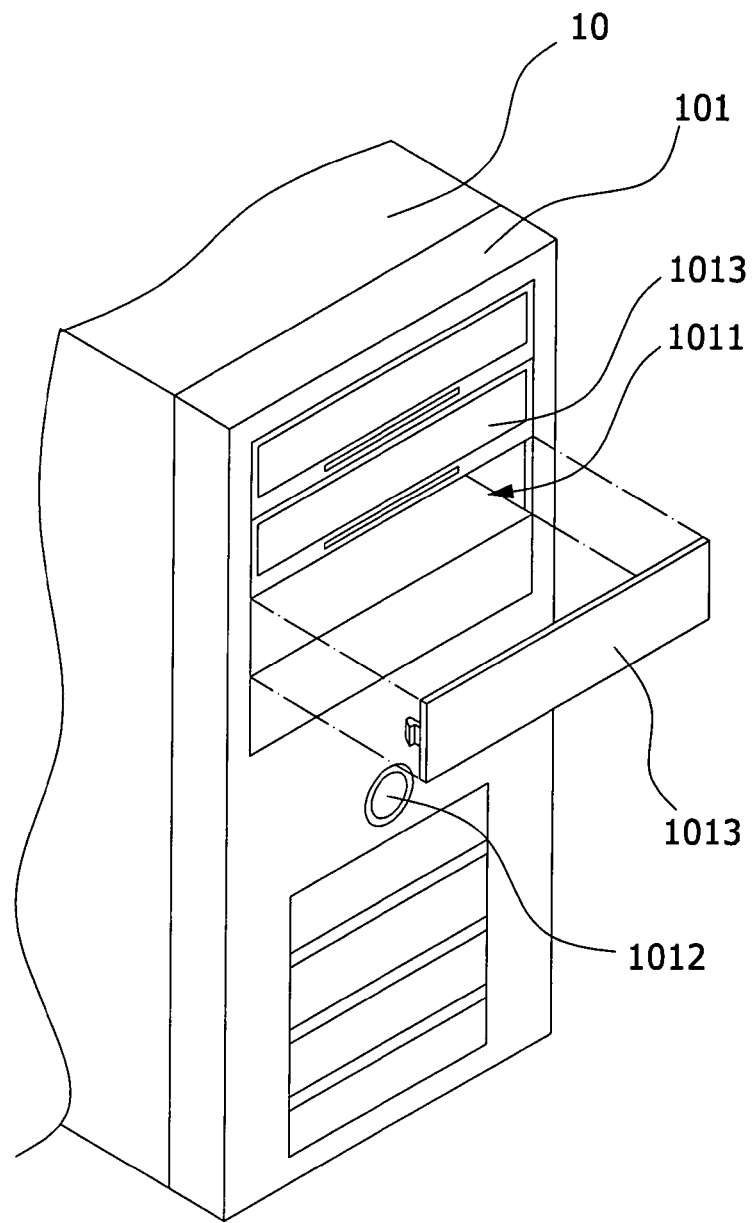
FIG. 1 shows a schematic view of a conventional panel of a computer casing.
Figure 2:
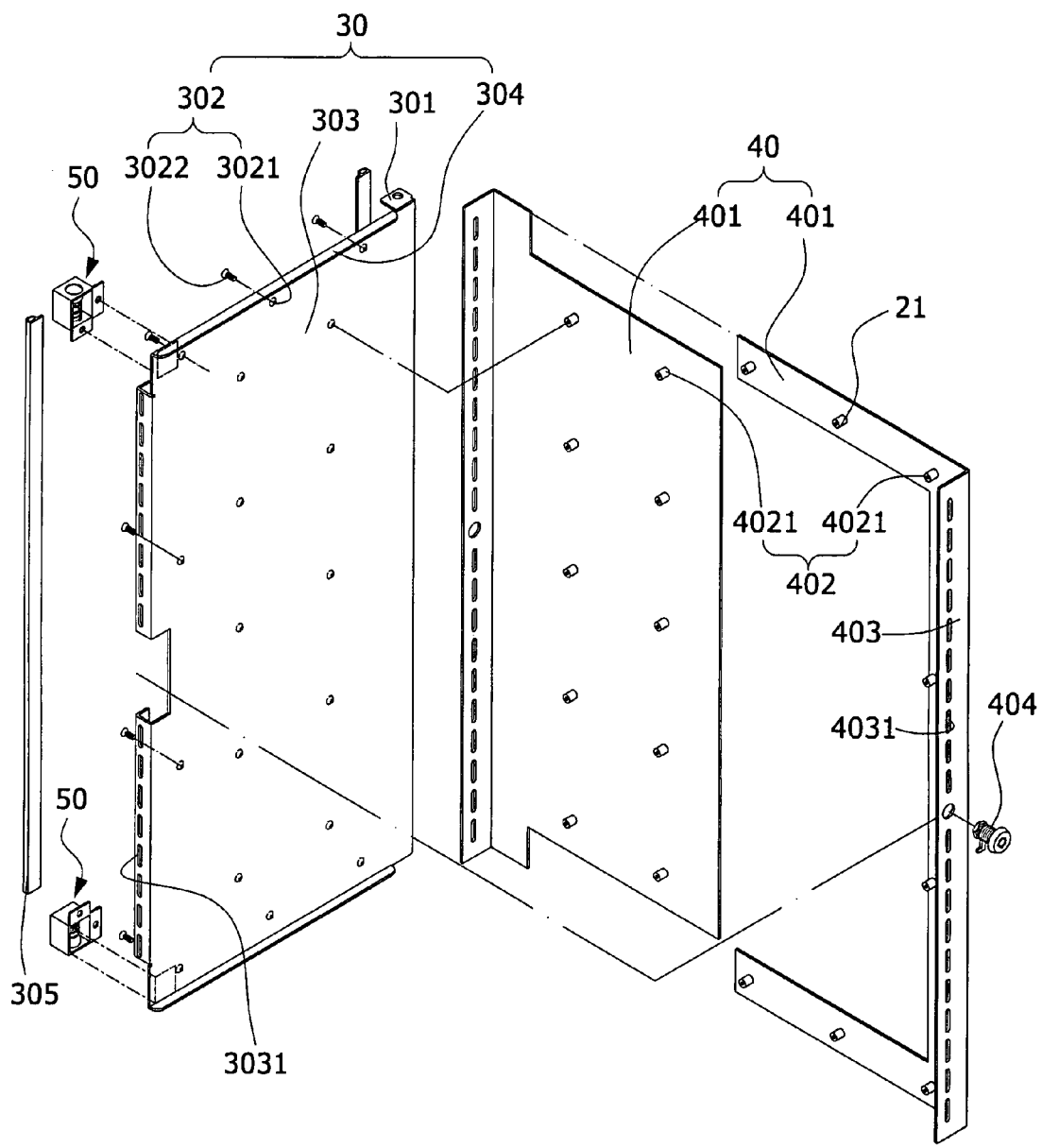
FIG. 2 shows an exploded view of the present invention.
Figure 3:
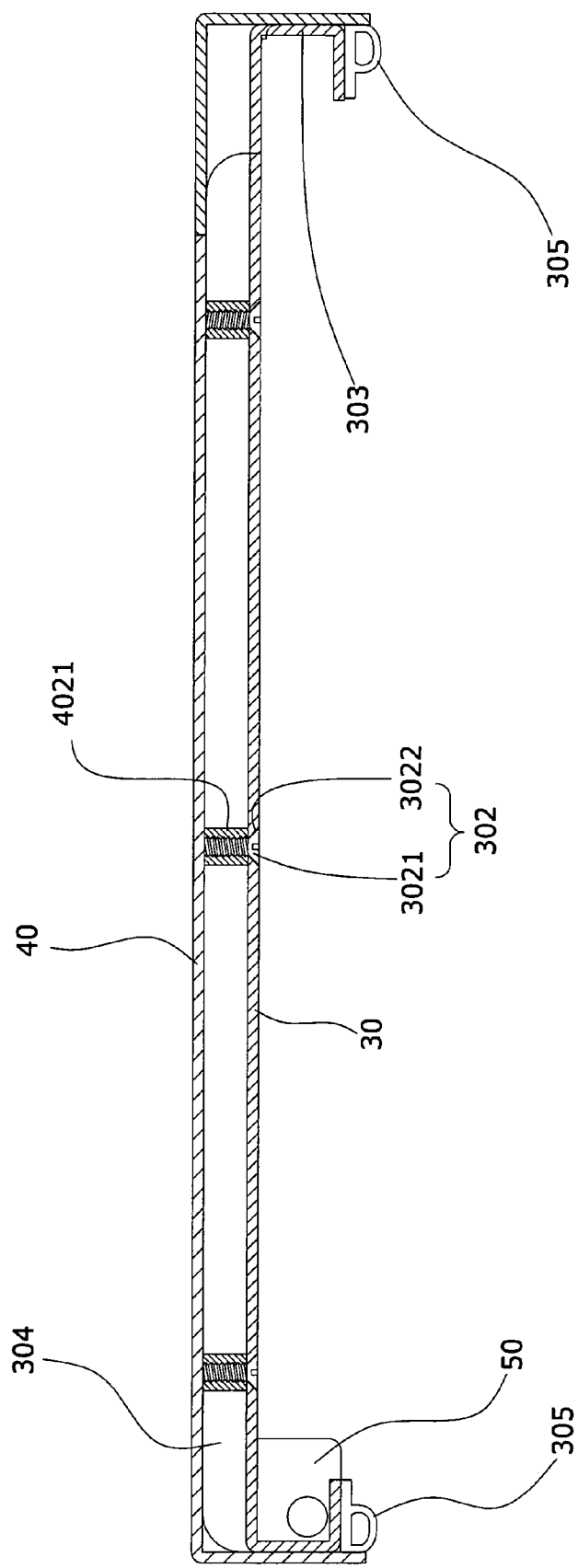
FIG. 3 shows a cutaway view of the present invention after being assembled.
Figure 4:
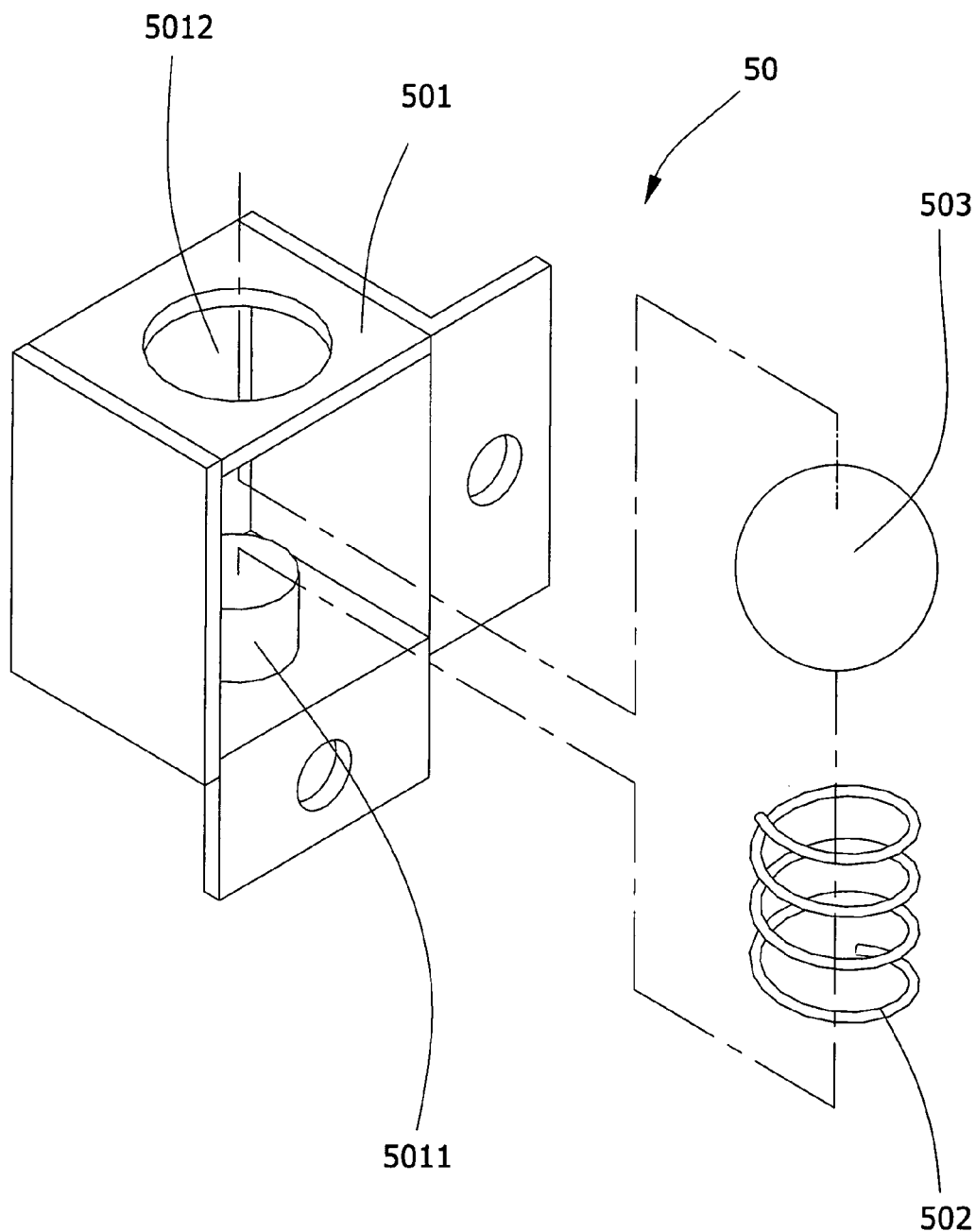
FIG. 4 shows an exploded view of an elastic locking member of the present invention.

Referring to FIG. 2 and FIG. 3, a panel cover structure for a computer casing, which is used to be pivoted on a pivot member 201 on a front of a computer casing 20, comprises a base panel 30, a decoration panel 40, and an elastic latching member 50 (as shown in FIG. 4).

The base panel 30 is made by bending a metallic board with metalworking, a side edge of which is provided with a pivot member 301 to be correspondingly pivoted on the pivot member 201 on the front of computer casing 20, a surface of which is provided with a plurality of locking members 302 which are used to open a plurality of positioning holes 3021, being transfixed with fixing screws 3022, on the base panel 30, two side edges of which are respectively provided with bended cushion pieces 303 being opened with a plurality of vent-holes 3031 for ventilation, and two side edges of which are respectively provided with sealing plates 304 to close an opening formed by the side edges after the base panel 30 is assembled with the decoration panel 40. In addition, a surface of the cushion piece 303 is provided with a collision-proof rubber strip 305 to prevent from a noise generated by a collision with the computer casing 20, upon opening and closing the panel cover.

The decoration panel 40 is a panel body 402 made by bending a metallic board with metalworking. A surface of the decoration panel 40 is provided with a plurality of corresponding locking members 402 which are welding bases 4021, such that when the decoration panel 40 is assembled with the base panel 30, the welding bases 4021 of decoration panel 40 can be transfixed into the positioning holes 3021 of base panel 30, and then are locked with the fixing screws 3022. Two side edges of the decoration panel 40 are respectively provided with bended pieces 403 on which are opened with a plurality of vent-holes 4031, and the decoration panel 40 can also be made by splicing a plurality of pieces of panel body 401 to correspond with a size and shape of the base panel 30, yet with the panel body 401 of different color. In addition, the bended piece 403 at one side of the decoration panel 40 is installed with a lock device 404 which can be used to lock the decoration panel 40 and the base panel 30 on the computer casing 20.

Figure 5:
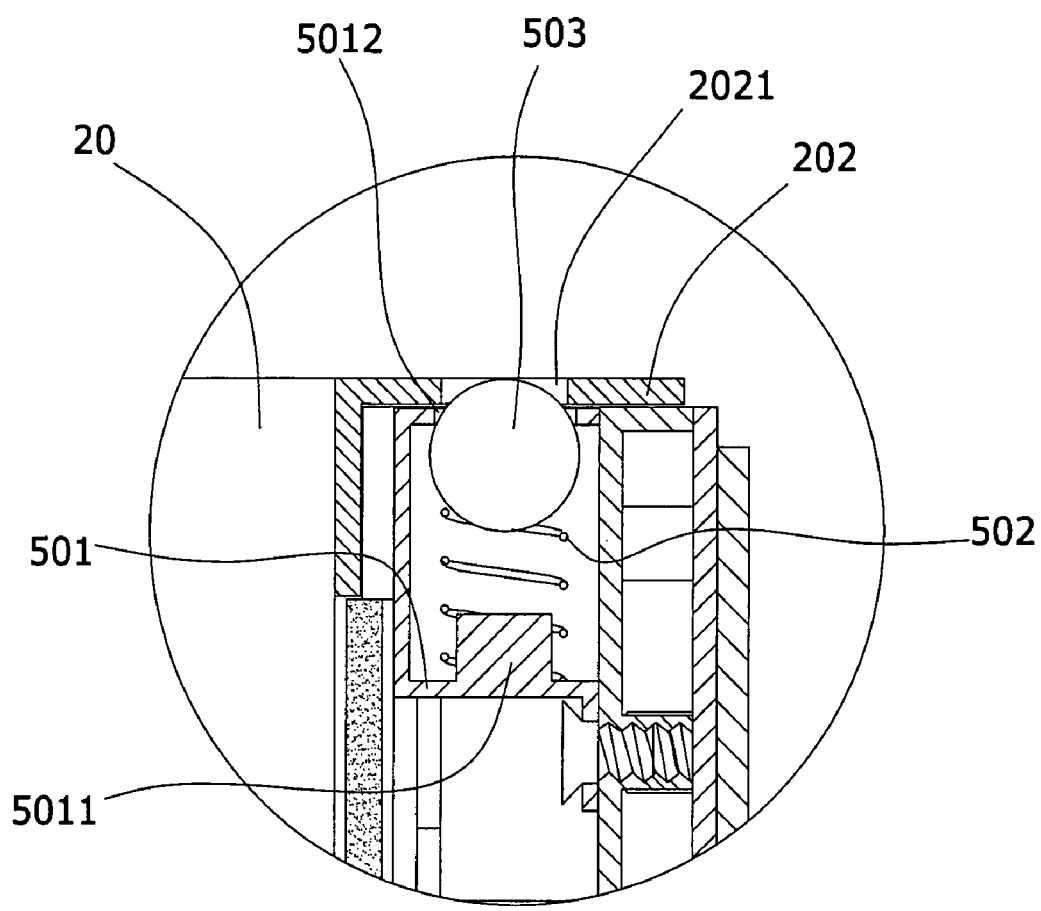
FIG. 5 shows a schematic view of an elastic locking member being assembled with a locking piece of the present invention.

Referring to FIG. 4, the elastic latching member 50 is installed at the other side edge opposite to the aforementioned pivot member 301 of base panel 30, and is constituted by a housing 501, a spring 502, and a steel ball 503, wherein the spring 502 and the steel ball 503 are located in an interior of the housing 501, the interior of the housing 501 is provided with a central block 5011 for sheathing and fixing the spring 502, and a side wall on the housing 501 is opened with a circular hole 5012 which is corresponding to the aforementioned central block 5011 and is having a diameter a little smaller than that of the steel ball 503. After the steel ball 503 is installed in the housing 501, a part of the steel ball 503 is exposed out of a surface of the housing 501. Referring to FIG. 5, the part of steel ball 503 that is exposed is correspondingly latched to a latching piece 202 of computer casing 20, and a center of the latching piece 202 is opened with a circular hole 2021 to be latched with the aforementioned steel ball 503; therefore after the present invention is installed at the front of computer casing 20, it can be temporarily fixed on the computer casing 20 by the elastic latching member 50.

Figure 6:
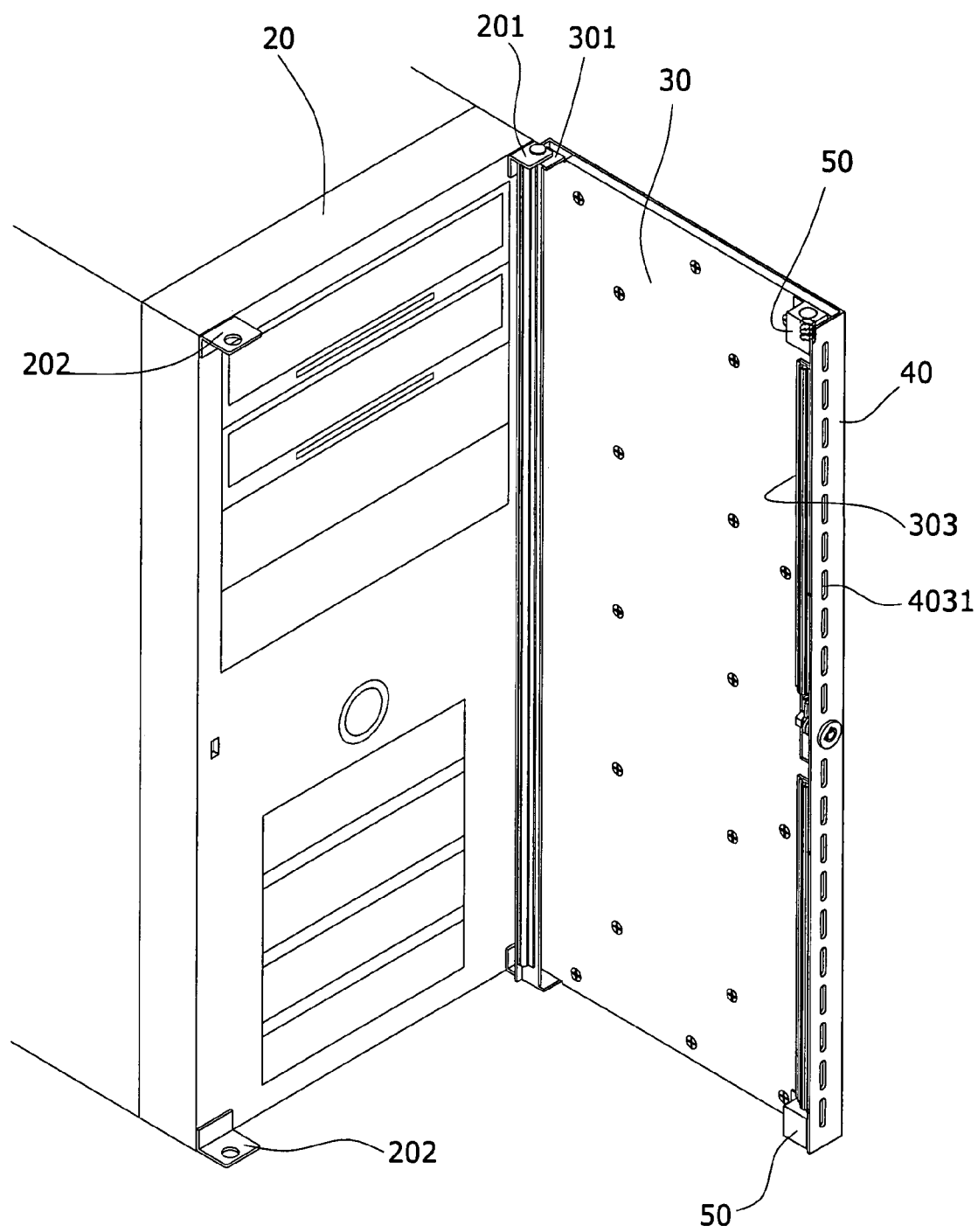
FIG. 6 shows a schematic view of the present invention being installed at a computer casing.

Referring to FIG. 6, the base panel 30 is first assembled with the decoration panel 40 to form a two-layer panel cover. Next, the pivot member 301 of base panel 30 is directly pivoted on the pivot member 201 of computer casing 20, such that the present invention can be opened and closed using the point of connection as a pivot, and can be temporarily latched by latching the elastic latching member 50 on the latching piece 202 of computer casing 20, thereby allowing a user to operate more conveniently.

Accordingly, after implementing the present invention, the two-layer panel cover structure can be formed to accurately achieve an object of providing a good protection and sound-proof effect. Moreover, the decoration panel of present invention can be assembled by splicing a single piece or multiple pieces of panel body, thereby forming all kinds of different geometric shapes or model and decoration effects of various colors on the same base panel, and being able to be freely collaborated according to a shipment requirement.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A panel cover structure for a computer casing, which is used to be pivoted on a front of a computer casing, comprising a base panel, a side edge of which is provided with a pivot member to be pivoted on the front of computer casing correspondingly, and a surface of which is provided with a first plurality of locking members; a decoration panel, a surface of which is provided with a second plurality of corresponding locking members to assemble the decoration panel on the base panel; and an elastic latching member, which is installed at the other side edge opposite to the aforementioned pivot member of base panel, is constituted by a housing, a spring, and a steel ball, with the spring and steel ball being installed in an interior of the housing, and is latched to a latching piece on the computer casing with a part of the steel ball that is exposed out of the elastic latching member.

2. The panel cover structure for a computer casing according to claim 1, wherein two side edges of the base panel are respectively provided with bended cushion pieces, and a surface of each of which is provided with a collision-proof rubber strip.

3. The panel cover structure for a computer casing according to claim 2, wherein the cushion piece is provided with a plurality of vent-holes for ventilation.

4. The panel cover structure for a computer casing according to claim 1, wherein two side edges of the base panel are respectively bended with sealing plates, so as to close an opening formed by the two side edges after the base panel is assembled with the decoration panel.

5. The panel cover structure for a computer casing according to claim 1, wherein two side edges of the decoration panel are provided with bended pieces, respectively.

6. The panel cover structure for a computer casing according to claim 5, wherein the bended pieces are provided with a plurality of vent-holes.

7. The panel cover structure for a computer casing according to claim 5, wherein the bended piece at one side of the aforementioned decoration panel is installed with a lock device, so as to lock the decoration panel and the base panel on the computer casing.

8. The panel cover structure for a computer casing according to claim 1, wherein the decoration panel is assembled by splicing multiple pieces of panel body to be corresponding to a size and shape of the base panel.

9. The panel cover structure for a computer casing according to claim 8, wherein a color of panel body can be different.

10. The panel cover structure for a computer casing according to claim 1, wherein an interior of the housing of elastic latching member is provided with a central block for sheathing and fixing the spring, and a side wall of the housing is opened with a circular hole, a diameter of which is a little smaller than that of the steel ball, corresponding to the central block; a local part of the steel ball being exposed out of a surface of the housing, after the steel ball being installed in an interior of the housing.

11. The panel cover structure for a computer casing according to claim 1, wherein a center of the latching piece is opened with a circular hole to be latched with the aforementioned steel ball.

* * * * *